Dec. 24, 1957  L. N. YOHE  2,817,502
APPARATUS FOR FREEZING DESSERTS
Filed March 13, 1952  2 Sheets-Sheet 2
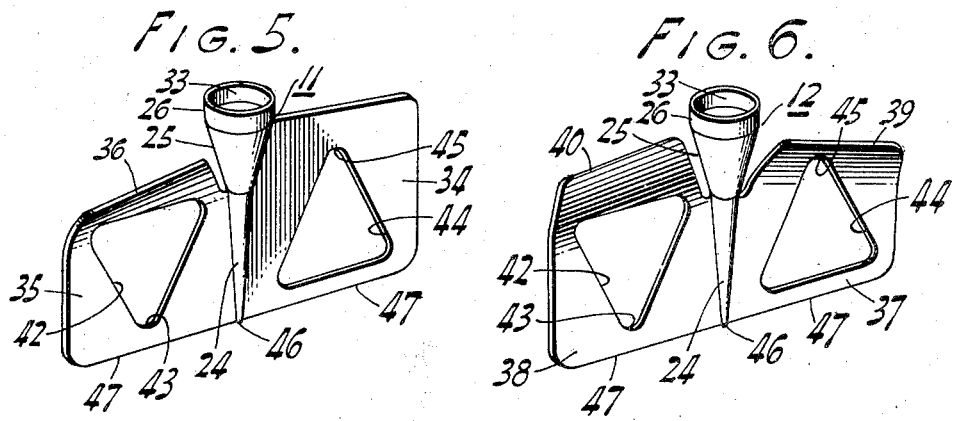
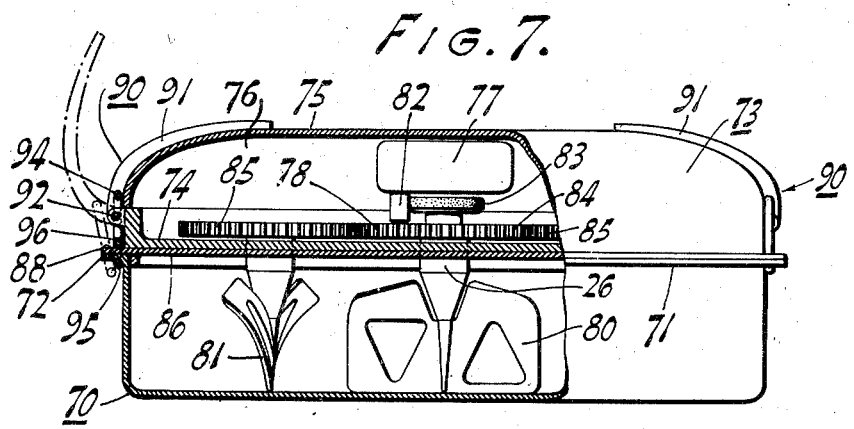
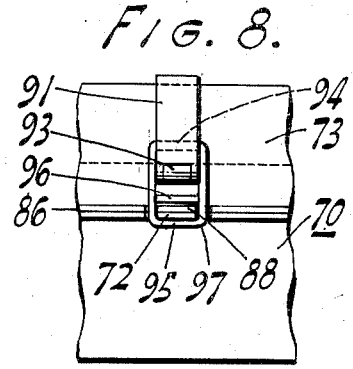
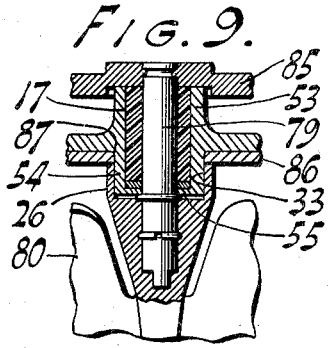
INVENTOR.
LESTER N. YOHE
BY
Lancaster Allwine and Rommel
HIS ATTORNEYS

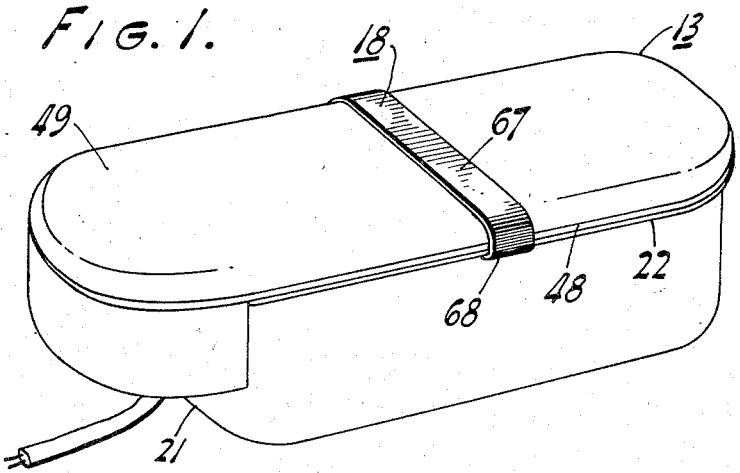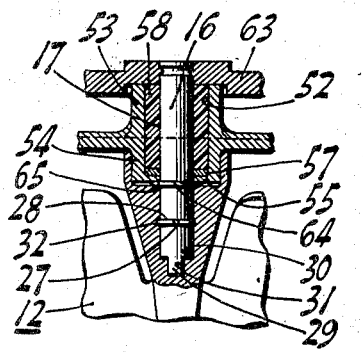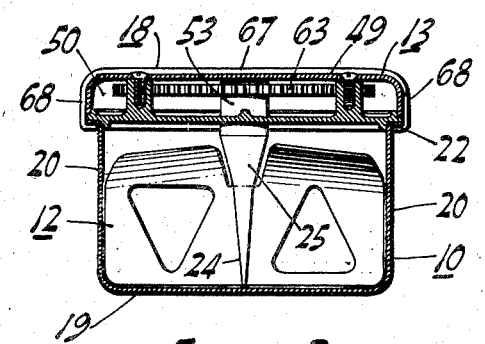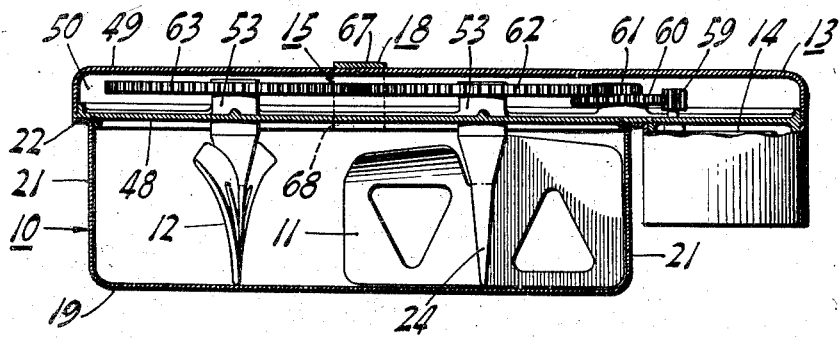

United States Patent Office 2,817,502
Patented Dec. 24, 1957

2,817,502

APPARATUS FOR FREEZING DESSERTS

Lester N. Yohe, Havertown, Pa., assignor, by mesne assignments, to The Silex Company, a corporation of Pennsylvania Application March 13, 1952, Serial No. 276,361

9 Claims. (Cl. 259—108)

The present invention relates to apparatus for freezing desserts, such as ice cream and other frozen delicacies in mechanically cooled refrigerators, and embodies improvements over that which is disclosed in my copending application for patent filed March 13, 1950, Serial No. 149,241 now forfeited.

In said application I disclose apparatus embodying an elongated tray in which the fluid mix is disposed and acted upon by agitators, revoluble about vertical axes, the agitators being carried by a lid casing in which is located motion transmitting means, operated by an electric motor, for rotating the agitators in counter directions. The agitators are detachably connected to the motion transmitting means and when the lid casing is removed, after the freezing operation, these agitators may remain in the frozen mass without materially disturbing the mass, to be later removed when it is desired to dispense the frozen material. The agitators each comprise a hub portion and laterally extending wings, at least one wing of each agitator being cambered in a direction to spoon material in the tray downwardly, or upwardly according to the direction of rotation of the agitator. For instance, if the agitator rotates in a direction so that the cambered portion trails in the path of rotation, it will, while rotating, spoon the material upwardly, and if rotated in the opposite direction, so that the cambered portion leads in the path of rotation, the material is spooned upwardly. By this arrangement, an operator may arrange the apparatus so as to provide a dessert which has the desired texture and density, such as a fluffy ice cream, by rotation of the agitators in a direction to spoon the material upwardly, or a denser ice cream, by rotation of the agitators in a direction to spoon the material downwardly. Instead of providing a reversible motor or reverse gearing in the motion transmitting means to accomplish the reversal of direction of rotation of the agitators, because they are expensive to manufacture, I provide motion transmitting means including drive studs which rotate in opposite directions, and detachably connect the agitators, one to each drive stud, and by interchanging the position of agitators on the drive studs they may be arranged to either spoon the material upwardly or downwardly.

The principal objects of the present invention are, to provide apparatus embodying parts so constructed and arranged as to guard against some of the fluid mix in the tray from working its way upwardly around the drive studs and into the lid casing, to guard against the agitators scraping the bottom of the tray, and to facilitate the coupling of the agitators with the drive studs in a manner that the operator need not observe the direction of rotation thereof, while operating, in order to dispose the agitators for the upwardly or downwardly spooning action.

Other objects are, to provide simple and efficient means to couple the lid casing to the pan, and to provide an auxiliary or intermediate lid which may remain on the pan after the lid casing carrying the motor and motion transmitting means has been detached from the assembly, and until it is desired to dispose the frozen mix from the pan.

A further object is to provide means whereby a person may easily pry the lid casing from the tray and from the intermediate lid, if such is provided, since frost which may exist in the refrigerator may bond these parts together and otherwise require thawing of the frost or breaking of the bond by use of a knife or other tool.

Further objects and advantages will appear in the following detailed description of two embodiments of the present invention, taken in connection with the accompanying drawings, forming a part of this specification, and in which drawings:

Fig. 1 is a perspective view of one form of freezer constructed according to the present invention.

Fig. 2 is a view mainly in vertical section, longitudinally of the freezer tray and lid casing, the motion transmitting means and agitators being shown in elevation.

Fig. 3 is a transverse, vertical sectional view through the freezer tray and cover casing, and showing one of the agitators and its drive gear in elevation, as well as a suitable clip for retaining the lid casing to the tray.

Fig. 4 is an enlarged, fragmentary view partly in vertical section and partly in elevation showing mainly a portion of the motion transmitting means, drive stud, bearing therefor and the upper central portion of one of the agitators.

Figs. 5 and 6 are perspective views of the preferred types of agitators differing one from the other in that Fig. 5 shows the agitator with one of the wings integral with the hub throughout its height, and the other wing free of the hub at its cambered portion, whereas in Fig. 6 both wings at their cambered portions are free of the hub.

Fig. 7 is a view partly in longitudinal, vertical section and partly in side elevation, showing a modified form of freezer.

Fig. 8 is a fragmentary end elevation of the freezer shown in Fig. 7.

Fig. 9 is a view similar to Fig. 3 but of the modified form shown in Fig. 7.

Referring first to the form of my invention, disclosed in Figs. 1–6 inclusive, it comprises an elongated tray 10 providing an upwardly opening shallow chamber for containing the fluid mix; agitators 11 and 12; an elongated combination lid and casing 13; an electric motor 14; motion transmitting means 15, operatively connected with the motor 14 and the agitators for imparting motion of the former to the latter, such means including a drive stud 16 for each agitator; a bearing means 17 for each drive stud 16; and, a suitable clip device 18 detachably securing the lid casing 13 to the tray 10. To some extent these elements, with the exception of the clip device 18, are, generally speaking, to be found in my copending application Serial No. 149,241 where the motor is carried by the lid casing in front of one end of the tray when the parts of the freezer are assembled, and the motion transmitting means is located generally above the tray. This arrangement is particularly well adapted for use in the evaporator of a mechanically cooled refrigerator to take the place of one of the trays primarily intended for the freezing of water.

The tray 10 includes a bottom 19 and side and end walls 20 and 21, respectively, providing an upwardly opening shallow chamber for containing the fluid mix, the end walls 21 preferably being rounded or substantially semi-circular in shape. The tray also includes, in the example shown, an outwardly extending flange 22 at its top or upper portion, which adds rigidity to the walls of the tray; provides a smooth surface for engagement with the lid casing and cooperates with the clip device 18 to retain the tray and lid casing in coupled relationship, The agitators 11 and 12 are each provided with a hub of novel formation, preferably comprising an inverted, substantially conical, lower body portion 24; an inverted, substantially frusto conical upper body portion 25; and, an upstanding circumferential flange 26 extending from the top of the body portion 25 providing a well 33 in the upper portion of the hub, for a purpose to be subsequently set forth. As a suitable arrangement for detachably connecting the agitator to its respective drive stud 16, the latter is provided with a circumferential groove 27 adjacent its lower portion, in which is partly disposed a split resilient ring or friction ring 28, and the drive stud 16 terminates at its lower end in a key extension 29, while the hub is provided with an axial bore 30 open to the well 33 and terminating in a polygonal socket 31, receiving the key extension 29, the bore 30 also being provided with a circumferential groove 32 at a zone to receive a portion of the ring 28 when the agitator is in proper, coupled relationship to the drive stud. The particular configuration of the hub has several advantages, such as ability to readily extract the agitator from the frozen mass of dessert in the tray because of the inverted conical portions, economy in manufacture, in contradistinction to a cylindrical hub which requires more metal, a substantial body portion where needed, such as the frusto-conical portion 25 in which the bore 30 and keying socket 31 are located, and as later pointed out, the cooperation of the flange 26 with characteristics of the lid casing to prevent liquid from finding its way to the bearing means 17.

The agitator 11 is equipped with paddle-like wings 34 and 35 integral with the hub at opposite sides of its axis. The wing 34 is integral with the hub throughout the height of the wing while the wing 35 has its upper portion 36 free of the hub and cambered as shown in Figs. 2 and 5. The agitator 12 is equipped with paddle-like wings 37 and 38 integral with the hub at opposite sides of the axis thereof and each of these wings has its upper portion free of the hub and the wings are cambered as at 39 and 40, respectively. These cambered portions extend in opposite directions with respect to the plane common to the main body portions of the wings. Thus the wing 34 of agitator 11, when rotating, serves to circulate the mass in the tray without spooning effect and serves as an indicator so a person may attach that particular agitator to one or the other of the drive studs 16 (which, due to the motion transmitting means to be subsequently described, rotate in opposite directions) in order to produce either a fluffy or a more firm product. The wings of the agitators 11 and 12, as shown in Figs. 2 and 3, move in such closely spaced relation to the bottom 19 and the ends 21 of the tray 10 as to have sweeping relationship therewith, so as to prevent a building up of frozen fluid thereon, before the entire mix has reached a frozen consistency.

It is preferred to provide one paddle-like wing of each agitator with a triangular opening 42 having its vertex 43 lowermost, and the other paddle-like wing with a triangular opening 44 having its vertex 45 uppermost. These openings permit pieces of comparatively solid matter, such as broken nuts, pieces of fruit, etc. which may be desirable in the mix, to pass therethrough, and the openings also each acts like a die through which some of the material acted upon passes and is thoroughly mixed or kneaded with that which passes through the trailing die.

I also prefer to cast or otherwise form each agitator so that the vertex 46 of its hub portion 24 is slightly below the lower margins 47 of the wings of the agitator, this vertex portion 46 to engage the tray bottom 19, as shown in Figs. 2 and 3 to prevent the agitator wings from scraping upon the tray bottom although moving in close proximity to or in sweeping relation to the bottom of the tray to prevent a building up of frozen fluid thereon, before the entire mix has reached a frozen consistency.

The lid casing 13 preferably comprises a lid proper 48 for engagement with the flange 22 and a cover 49 providing a cavity 50 in which most of the motion transmitting means 15 is located. The lid member 48 may be a metal casting, and the cover a unit pressed to shape from sheet metal. In the example shown, the lid member 48 is provided with vertical hole 52 for accommodation of each drive stud 16 and its bearing means 17, the hole being surrounded by an upper circular boss 53, and a lower circular boss 54 concentric with the hole. The boss 53 preferably includes an internal circumferential flange 55 upon which the bearing means 17 rests. The boss 34 is surrounded by the well 33 of the agitator hub when the parts are assembled and this arrangement effectively prevents dessert material, which is circulated in the tray chamber and at times moves or is spooned upwardly to the underside of the lid proper 48, from working its way to the bearing means 17.

The bearing means 17 preferably comprises a washer-like lubricating unit 57 resting upon the flange 55 and a sleeve-like bearing unit 58 which may be made of any suitable material such as synthetic resin or plastic and rests upon the unit.

The motion transmitting means is substantially like that shown in my copending application Serial No. 149,241 and comprises a pinion 59 on the drive shaft of motor 14, a gear wheel 60 meshing therewith which drives a pinion 61 meshing with a relatively large gear wheel 62 provided with one of the drive studs 16. The gear wheel 62 meshes with another relatively large gear wheel 63 provided with another of the drive studs 16. In this manner the two drive studs 16 are rotated in counter directions by operation of the motor. The pinions and gear wheels of this motion transmitting means are arranged to extend generally in a direction longitudinally of the elongated lid casing 13 in the cavity 50 thereof, so that the wheels 62, 63 rotate in horizontal planes and rest upon their respective bosses 53 as shown more in detail in Fig. 4. Each drive stud 16 may be provided with a second circumferential groove 64 in a zone of the bottom of the lower boss 54, the groove partially receiving a resilient split ring 65 in engagement with the lower boss, and more particularly with the flange 55. Thus the upper boss 53 through the wheel engaging it effectively prevents downward movement of the drive stud when detaching an agitator therefrom and the ring 65 by its engagement with the lower boss 54 effectively prevents upward movement of the drive stud when an agitator is pushed thereon.

With reference to the clip device 18, it is preferably made of band metal bent to substantially inverted U-shape, its bight portion 67 engaging upon the lid 13 and its arms 68 engaging beneath the flange 22 of the tray 10 as shown in Figs. 1, 2 and 3. The clip device may be slid longitudinally of the assembly when placing or removing it from embracing relationship to the lid and tray.

Referring now to the modified form of invention shown in Figs. 7, 8 and 9 it resembles somewhat a modified form shown in my copending application Serial No. 149,241 and is particularly well adapted for use in deep freeze mechanically cooled refrigerator units, or in evaporators having space for units larger than the usual ice cube trays.

It may be provided with a tray 70 like or similar to the tray 10 and provided with an outstanding flange at its upper portion, in this form divided into two major flange sections 71 extending throughout the length of the tray sides and portions of its ends, and two minor flange sections 72 at the ends of the tray.

A lid casing 73 comprises a lid proper 74 and a cover 75, providing a cavity 76 in which a motor 77 and motion transmitting means 78 are mainly located, the motion transmitting means including drive studs 79, one for each of a plurality of agitators 80, 81 located in the tray. The motor 77 may be provided with a friction wheel 82 on its drive shaft which imparts movement to a friction wheel 83 operatively connected to a horizontally disposed gear wheel 84 carrying one of the drive studs. The wheel 84 meshes with one or more horizontally disposed gear wheels 85 each carrying a drive stud 79.

The lid member 74 is provided with upper and lower bosses 53 and 54, respectively, the same as in the first form, and otherwise may be made as therein disclosed to include the arrangement of bearing means for the drive studs, and the agitators with wells for cooperation with the lower bosses 54.

In this modified form of freezer another or intermediate lid 86 is provided, interposed between the lid member 74 and the tray 70, this lid 86 being provided with a hole 87 for receiving each lower boss 54 of the lid member 74 as shown more in detail in Fig. 9, where the boss is shown as extending below the lower face of the intermediate lid 86 as is engaged by the flange 26 of the agitator hub. This lid 86 may be left on the tray after the dessert is frozen and the lid casing as well as the parts carried thereby, removed from the assembly, under which condition the agitators are left in the frozen mass and close the openings 87.

It will also be noted that I prefer to provide the intermediate lid 86 with a flange 88 at each end to overlie the companion flange 72, for cooperation with a suitable clip device 90 at each end of the freezer. The clip device 90 includes a lever 91 having its one end pivoted, as by pivot pin 92 extending through a lug 93 on the lid 74 above the flanges 72 and 88 in a first or retaining position, and to swing in a vertical plane, to a second or releasing position, so that its free end portion may be disposed above the lid as shown by full lines in Fig. 7, or disposed laterally of the lid casing as shown by dot and dash lines in Fig. 7. The clip device also includes a link 97 pivoted as by a cross bar 94 thereof extending freely through the lever in offset relation to the pivot pin 92 and engaging, as by another cross bar 95 thereof, beneath the tray flange 72, when the lever is in the first or retaining position, whereby the lids 74 and 86 are clamped tightly upon the tray, but are not so clamped when the lever is in the second or releasing position, since then the cross bar 95 is free of the flange 72. However, since the lid 74 may be bonded to the intermediate lid 86 by frost, it is preferred to also equip the link 97 with a third cross bar 96 disposed in spaced relation above the flange 88 of the intermediate lid when the lever 91 is in the first or retaining position, but engaging upon the flange 88 when the lever is swung to the second or releasing position, so that the link then acts as a strut to pry the lid 74 from the lid 86.

The operation of the freezers herein disclosed would seem to be obvious, but, in the interest of clearness, it may be said that in the use of the invention illustrated, the form of freezer shown in Figs. 1–4 may be equipped with an intermediate lid and clip devices shown in the form in Figs. 7–9 or the intermediate lid in the latter may be dispensed with and other changes made without departing from the spirit of the invention as defined in the following claims.

I claim:

1. In a freezer of the character described the combination of a tray provided with an outwardly extending flange at its upper portion, a lid casing for said tray, an agitator in said tray, a motor carried by said lid casing, motion transmitting means in said lid casing operatively connected to said motor and agitator for imparting movement of the former to the latter, and a clip device engaging said lid casing and said tray flange, comprising a lever having its one end portion pivoted to the side of the lid casing, above said flange of the tray, to swing in a vertical plane, so that its free end portion may be disposed above the lid casing in a first position, and disposed laterally of the lid casing in a second position when swung away from said first position, and a link pivoted to said lever in offset relation to the pivot of the lever to the lid casing, and engaging with and beneath said tray flange when the lever is in said first position, and free of said flange when the lever is in said second position.

2. The freezer as set forth in claim 1 in which said agitator is detachably connected with said motion transmitting means, an intermediate lid is disposed between said lid casing and tray and provided with a flange above the flange of the tray, and said link includes a member disposed in spaced relation and above the flange of said intermediate lid when said lever is in said first position and engaging upon said last mentioned flange when said lever being swung to said second position and acting with the link as a strut to pry the lid casing from the intermediate lid, as the lever is swung to said second position, and leave the agitator in any frozen mix in the tray.

3. As an article of manufacture, an agitator unit for freezers comprising, a hub and laterally extending paddle-like wings integral therewith, the major portions of which extend in a common vertical plane and are integrally connected with the hub, said hub including an inverted substantially conical lower portion, the vertex of which extends below the lower margins of the wings, said hub also including an inverted substantially frusto conical upper portion above said lower portion with a concentric bore terminating in a polygonal socket at its bottom in said upper portion for the reception of a detachable drive shaft, and an upstanding circumferential flange providing a well in the upper portion of the hub.

4. An agitator unit for freezers in accordance with claim 3 wherein the laterally extending wings are integral with the hub, one of said wings integral with the hub throughout its height, and the other of the wings having its upper portion free of the hub and cambered.

5. In apparatus for freezing fluid dessert mixes in mechanical refrigerators, the combination of an elongated tray providing an upwardly opening chamber for containing the fluid mix; a lid for the tray, at least two vertical drive studs carried by said lid and extending through the same into the chamber of the tray, said studs being in spaced apart relation longitudinally of the lid and tray, a hub in said chamber detachably connected with each of said drive studs, and means carried by and revoluble with each of said hubs configurated to cause the fluid mix to flow upwardly therein toward the underside of said lid, a downwardly extending boss at the underside of the lid surrounding each of said drive studs above its respective hub, and means on each of said hubs providing a well at its upper end to receive and surround its respective boss.

6. A freezer of the character described, the combination of a tray having an outwardly extending flange at its upper portion, a lid casing for the tray provided with an opening defined by an annular boss depending from the lid casing coaxially of said opening and inwardly of the tray, a motor and transmission means carried by said lid, an agitator rotatable in the tray coaxially of said boss and having a driving connection with said transmission means through the opening in said lid casing, a hub on said agitator having an annular well in which is received the annular boss of the said lid casing, and a clip device slidably supported on the lid casing and having an end portion engageable with the flange of said tray to secure said lid casing in position on the tray.

7. A freezer of the character described, the combination of a tray having an outwardly extending flange at its upper portion, a lid casing for the tray provided with an opening defined by an annular boss depending from the lid casing coaxially of said opening and inwardly of the tray, a motor and transmission means carried by said lid, an agitator rotatable in the tray coaxially of said boss and having a driving connection with said transmission means through the opening in said lid casing, a hub on said agitator having an annular well in which is received the annular boss of the said lid casing, an intermediate lid for the tray intermediate the latter and the lid casing and having an opening therein through which is received the boss of the lid casing, and a clip device slidably supported on the lid casing and having an end portion engageable with the flange of said tray to secure the intermediate lid and said lid casing in position relative to each other and on the tray.

8. In a freezer of the character described, the combination of a tray, an agitator in said tray, a first lid engaging the marginal edge of said tray substantially closing the latter and provided with an opening therein, a second lid disposed above said first lid and provided with an opening defined by a boss extending coaxially of and into the opening of said first lid, a motor carried by said second lid, transmission means also carried by said second lid and operatively connected to said motor for driving said agitator, and means extending through said boss providing a detachable connection between said transmission means and said agitator.

9. In a freezer of the character described, the combination of a tray, an agitator in said tray, a first lid engaging the marginal edge of said tray substantially closing the latter and provided with an opening therein, a second lid disposed above said first lid and provided with an opening defined by a boss extending coaxially of and into the opening of said first lid, a motor carried by said second lid, transmission means also carried by said second lid and operatively connected to said motor for driving said agitator, means extending through said boss providing a detachable connection between said transmission means and said agitator, and a hub on said agitator engageable with the first lid to retain the agitator in the tray when the second lid with the motor and transmission means is removed from said first lid.

References Cited in the file of this patent

UNITED STATES PATENTS

| | | |
|---|---|---|
| 146,981 | Bengernagel | Feb. 3, 1874 |
| 348,639 | Riley | Sept. 7, 1886 |
| 1,783,349 | Watt et al. | Dec. 2, 1930 |
| 1,873,407 | Holland | Aug. 23, 1932 |
| 1,885,139 | Porter | Nov. 1, 1932 |
| 1,981,008 | Torson | Nov. 20, 1934 |
| 2,047,467 | Gobrick | July 14, 1936 |
| 2,071,410 | Kuhn et al. | Feb. 23, 1937 |
| 2,085,160 | Kaup et al. | June 23, 1937 |
| 2,093,534 | Wright | Sept. 21, 1937 |
| 2,226,372 | Cravaritis | Dec. 24, 1940 |
| 2,325,434 | Stiles | July 27, 1943 |
| 2,577,896 | Kinton | Dec. 11, 1951 |
| 2,584,887 | Lawrence | Feb. 5, 1952 |